United States Patent [19]

Sherer

[11] 4,160,156
[45] Jul. 3, 1979

[54] METHOD AND APPARATUS FOR READING BAR CODED DATA WHEREIN THE LIGHT SOURCE IS PERIODICALLY ENERGIZED

[75] Inventor: Paul Sherer, Costa Mesa, Calif.

[73] Assignee: MSI Data Corporation, Costa Mesa, Calif.

[21] Appl. No.: 902,892

[22] Filed: May 4, 1978

[51] Int. Cl.² .................. G06K 7/14; G08C 9/06
[52] U.S. Cl. ............................ 235/463; 235/472; 250/468
[58] Field of Search ............. 235/462, 463, 472; 250/555, 566, 568, 569

[56] References Cited

U.S. PATENT DOCUMENTS

| | | |
|---|---|---|
| 3,736,410 | 5/1973 | Ragland et al. .................. 235/472 |
| 3,748,483 | 7/1973 | Englund et al. .................. 235/472 |
| 3,925,639 | 12/1975 | Hester .................. 235/462 |
| 4,072,859 | 2/1978 | McWaters .................. 250/568 |

Primary Examiner—Daryl W. Cook
Attorney, Agent, or Firm—Edward J. DaRin, Inc.

[57] ABSTRACT

A method and apparatus for reading bar coded data for entry into portable data collection systems. The data is read by an optical wand wherein the light source is automatically and periodically energized for saving the energy of the system. The D.C. offset voltages are determined and stored in an up/down counter during reading or sampling intervals while the analog signal processing circuits are periodically de-energized. The light source is also calibrated to maximize the power savings and minimize reading errors.

17 Claims, 3 Drawing Figures

METHOD AND APPARATUS FOR READING BAR CODED DATA WHEREIN THE LIGHT SOURCE IS PERIODICALLY ENERGIZED

PRIOR ART AND SUMMARY OF THE INVENTION

This invention is an improvement over the method and apparatus for reading bar coded data disclosed and claimed in U.S. Pat. No. 3,925,639 granted on Dec. 9, 1975. The disclosure in the Hester U.S. Pat. No. 3,925,639 is directed to bar code readers utilized with portable data collection systems. The Hester patent discusses two basic problems attendant to the use of optical scanners or optical wands for reading bar coded data in conjunction with battery powered data collection devices. The two significant problems are the drain on the battery and the production of the unknown D.C. offset voltage which may be on the order of a magnitude, or more, greater than the amplitude of the desired data signal. The power consumption or drain on the battery has been solved as discussed in the Hester patent by periodically energizing the light source in the optical scanner or wand. The offset voltage problem has been solved by storing the offset voltage on a capacitor arranged in a simple sample and hold circuit. The Hester circuit permits the data signal to be extracted from a large and unknown offset voltage signal. In order to achieve these results with the Hester circuit, however, it is necessary to maintain all of the analog signal processing circuits associated with the optical scanner or wand continually energized while periodically energizing and de-energizing the light source.

It has also been determined that the amplitude of the signal derived from an optical scanner or wand varies with initial tolerance, temperature and aging which can introduce ambiguities into the processing or the reading of the bar coded data. This results through "the shades" of reflectance and the variations that occur in the currents that are utilized for energizing the light source in an optical scanner or wand.

The present invention provides an improved method and apparatus for reading bar coded data while utilizing the prior art concept of automatically and periodically energizing the light source for maintaining the drain on the power source at a minimum.

The present invention advantageously combines analog and digital signal processing circuits and techniques which not only permits the light source to be periodically de-energized but also the analog signal processing circuits to be simultaneously de-energized with the light source while continuously maintaining a signal representative of the offset voltage in storage to further reduce the power consumption thereby permitting the use of an optical wand at low power levels heretofore not thought possible. The reduction in power consumption is accomplished without operator intervention. The concept of the present invention also allows the automatic calibration of the light source to produce a standard output signal to thereby minimize reading ambiguities leading to consistent reading results.

From a method standpoint, the present invention comprehends a method of optically reading bar coded data wherein binary bits are encoded in terms of bars of different widths of the same optical characteristics separated by areas of the opposite optical characteristics. The method includes the steps of producing relative movement between bar coded data and the optical bar coded sensor which produces electrical signals representative of the sensed binary bar coded bits. The optical scanner includes a light source and a light sensor for receiving the light rays reflected from the bar coded data representative of the sensed binary bits and producing corresponding electrical analog signals. The light source and the associated signal processing circuits are normally maintained de-energized and are automatically and periodically energized at a preselected rate. The voltage value of the offset signals generated by the signal processing circuits is automatically determined and continuously stored. After the difference between the stored offset voltage signals and the signals produced by the light sensor and associated signal processing circuits are amplified, or compared, the reflective characteristics of the surface exposed to the sensor is determined. If no reflective surface is sensed, the light source and the associated signal processing circuits are automatically de-energized while maintaining the offset voltage signal in storage. If a reflective surface is sensed, the light source and the associated signal processing circuits are maintained energized while generating the electrical signals representative of the bar coded data.

From a broad apparatus standpoint, the apparatus for optically reading a bar coded data with an optical sensing means includes analog signal processing means for processing the signals from the optical sensing means and providing analog signals representative of the sensed bars of the different optical characteristics. Digital signal processing means for storing and continuously signalling the analog value of the offset signals that are generated are coupled to the analog signal processing means. Control circuit means are provided which include means for automatically and periodically energizing the light source and the analog signal processing means for maintaining the energization of these elements in response to a signal representative of a bar of one optical characteristic and for automatically de-energizing said elements in response to a signal representative of a bar of the other optical characteristic.

These and other features of the present invention may be more fully appreciated when considered in the light of the following specification and drawings, in which.

Figure 1:
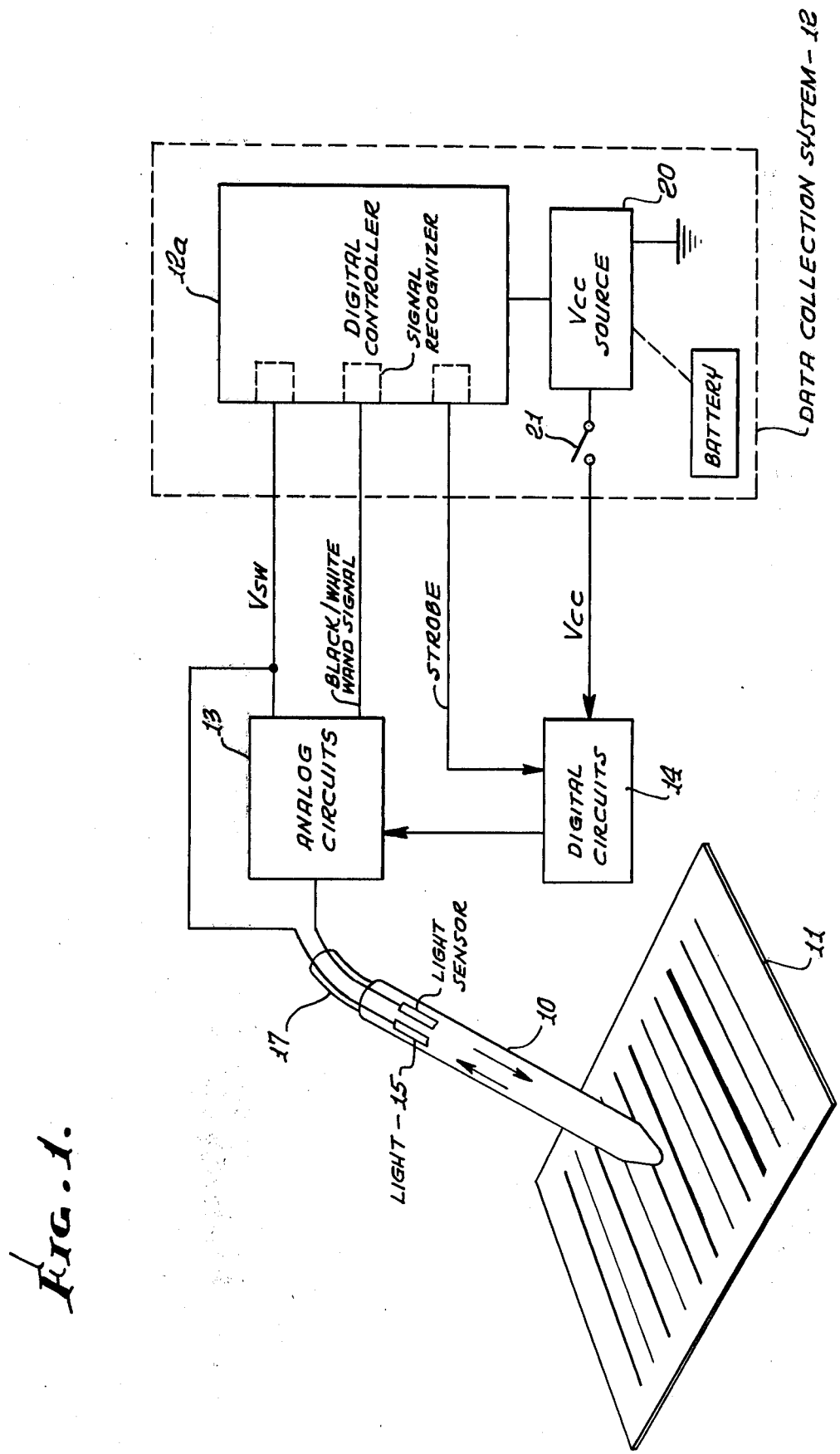
FIG. 1 is a diagrammatic view of an optical scanner, or wand, for use with a data collection system illustrating the scanner juxtaposed to a bar coded data and embodying the present invention.

The present invention will be described as it may be incorporated into a data collection system of the type manufactured and sold by MSI Data Corporation of Costa Mesa, Calif. and in particular the MSI Model 2100 system which includes a microprocessor utilized as a digital controller. The microprocessor includes a programmable read only memory which can readily be programmed by those skilled in the art, all as disclosed in the Hester U.S. Pat. No. 3,925,639 in column 6, lines 30–35 and which disclosure is incorporated herein by reference. The present invention makes use of a similar microprocessor as a digital controller for energizing and de-energizing the light source and associated circuits as will be discussed hereinafter.

The present invention, as in the disclosure in the aforementioned Hester patent, is directed to the circuits that interface and process the signals provided by the optical scanner for further processing and use by the data collection system proper. Also, the construction of the wands or optical scanners per se employed for sensing the bar coded data are commercially available devices and per se do not form a part of the present invention. The invention may be implemented by means of two types of optical scanners or wands that are presently commercially available and in use.

The light source utilized in the optical scanner or wand is preferably one having a fast response time such as exhibited by the commercially available light emitting diodes, LED. At this point, it should be noted that whenever the terms "light source" or "light rays" or similar terms are employed in conjunction with the description and claims of the present invention that the terms are not restricted to visible light as the radiation from the light source may be in the infrared region for the purposes of the present invention.

Bar coded data, as the term is employed for the purposes of the present invention, comprises binary coded information recorded on a surface and encoded in terms of bars and spaces having different optical or reflective characteristics. Common examples of such bar coded data are the simplified bar code disclosed in the Hester patent or the more complex Universal Product Code, UPC, generally employed on most products merchandised in the grocery and hardware businesses. These bar codes generally comprise a series of printed black and white bars for representing data. The recorded data is encoded by a series of dark and light bars having varying widths with the information being encoded in terms of the sequencing of the bars. One pair of bars may represent a binary character of one kind, while a pair of bars of different widths may represent a binary character of the opposite or the other kind. For example, a narrow, dark bar followed by a wide white space will represent the binary character 0, while a wide dark bar followed by a narrow white space will represent the opposite binary character or the binary character 1. The object of the sensing of such bar coded data is to produce the analog electrical equivalent of the bar coded data represented as a series of "black and white" signals for further processing in a data collection system.

Now referring to FIG. 1, the general organization of the invention will be described. An optical scanner, or wand 10, as illustrated in FIG. 1 positioned over a bar coded label 11 and interfaced with a data collection system 12 through analog signal processing circuits 13 and digital circuits 14 for processing the electrical signals provided by the wand 10. The type of optical scanner or wand under consideration in this embodiment of the invention includes a light source 15 and a light sensor 16 having independent light paths. The light source 15 and the light sensor 16 are arranged in the wand 10 so that the light paths for the light 15 and the sensor 16 converge only at the object being scanned or a label 11 as illustrated in FIG. 1. The signal reflected from the label 11 and converted to an electrical signal by the sensor 16 is amplified to a power level sufficient to permit it to be conveyed along a cable 17 to the signal processing circuits 13 and 14.

The data collection system 12 includes a digital controller 12a that provides the necessary control signals for determining the reflective characteristics of the scanned surface. The digital controller 12a may include a commercially available microprocessor that can be readily programmed by one skilled in the art to recognize the differences between valid and invalid data and when to switch the necessary signals to the signal processing circuits 13 and 14 for energizing or de-energizing the light source 15 and to control the signal processing. As in the aforementioned Hester patent, the microprocessor can be programmed to determine that the data is valid or incomplete and upon the subsequent passing of the wand 10 over the label 11, the correct data will be recognized by the data collection system 12 and processed accordingly.

For the purposes of understanding the operation of the analog and digital signal processing circuits 13 and 14, the sequencing of the control signals provided by the digital controller 12a should be understood. The digital circuits 14 are continuously energized during the wand scanning operations. To this end, the digital circuits 14 are connected to the battery supply voltage for powering the data collection system 12 and are illustrated in FIG. 1 as connected to the $V_{CC}$ source 20. The $V_{CC}$ power supply is connected to the digital circuits 14 through an ON/OFF switch 21. Once the switch 21 is operated to a closed circuit condition, the digital circuits 14 will always be energized until it is opened once again. The digital controller 12a is also connected to the power source or battery for the data collection system 12 for controlling the energization and de-energization of the light source 15 for the wand 10 and simultaneously the analog signal processing circuits 13. Automatically and periodically, a signal identified as the $V_{SW}$ signal is provided by the digital controller 12a for energizing the light source 15 and the analog circuits 13 for preselected time intervals. The power line $V_{SW}$ is only turned on by the digital controller 12a for determining the reflective characteristic of the surface being sensed or the bar coded label 11 so as to conserve battery energy. The time that the signal $V_{SW}$ is energized need only be sufficient for the analog circuits 13 to settle while the time intervals between the ON periods need be short only relative to human perception times. Typically, the duty cycle of ON to OFF time can be less than one percent. In addition to the $V_{SW}$ signal, the digital controller 12a provides a strobe signal coupled to the digital circuits 14. The strobe signal is active when it goes from a low voltage level to a high voltage level and is initiated a preselected time interval after the $V_{SW}$ line is turned ON and coexists for the remaining time duration that the $V_{SW}$ line is ON.

The problem solved by the present invention, in a mode distinctly different from the solution disclosed in the aforementioned Hester patent, relates to the storage of the unknown offset voltage generated by the signal processing circuits. The sensing and amplification means for the wand 10 introduces relatively large and unpredicatable D.C. offset voltages which vary with temperature and supply voltage magnitude. The power supply as used in portable data collection systems is generally a battery. Battery voltages vary with temperature and the amount of charge remaining in the battery. It will, of course, be appreciated that if the light source 15 for the wand 10 is de-energized but the wand amplifier is powered, the signal derived from the wand 10 will consist only of the D.C. offset voltage prevailing.

Figure 2:
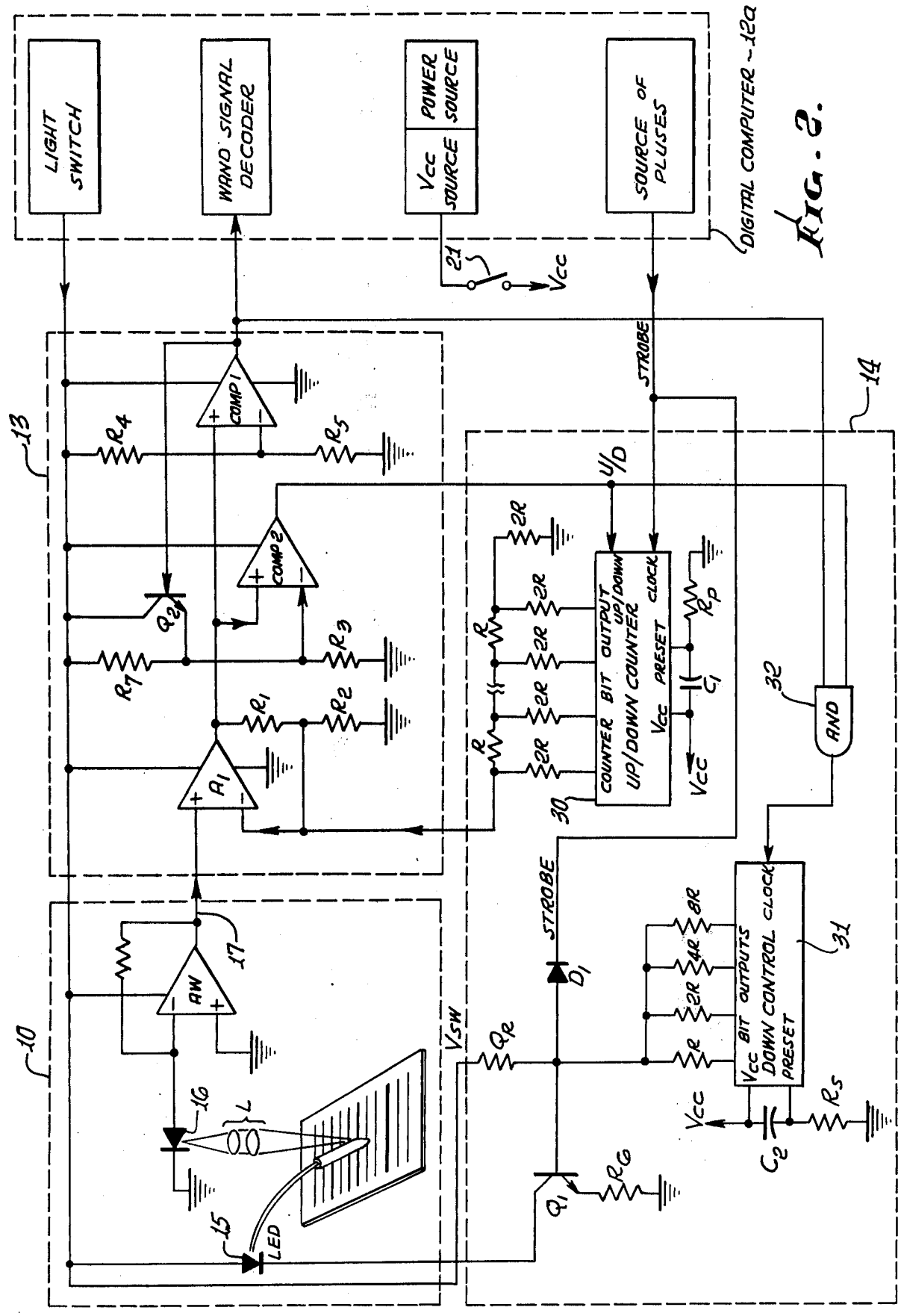
FIG. 2 is a schematic circuit diagram of the analog-digital signal processing circuits of FIG. 1 as integrated into a data collection system.

Now referring to FIGS. 2, the detailed circuit organization of the invention will be examined. The structure of the wand 10 is diagrammatically illustrated in FIG. 2. The light source 15, housed in the wand 10, is illustrated in the form of a light emitting diode, LED. The light generated from the source 15 is guided from the source to the surface to be sensed, which is illustrated as the bar coded label 11, by fiber optical means or other convenient light pipes. The light rays reflected from the label 11 are focused onto the light sensor 16 by a pair of lenses L. The light sensor 16 is illustrated in FIG. 2 as a conventional photodiode. The electrical output signals from the light sensor 16 resulting from the impingement of the reflected light rays thereon are amplified by means of an amplifier AW illustrated as a conventional operation amplifier that is arranged to be carried in the wand 10. The signal from the sesnor 16 are coupled to the negative input terminal of the amplifier AW, while its positive terminal is connected to ground. The amplified version of the reflection signal and the offset voltage signal are coupled to the analog signal processing circuits 13 by means of the cable 17.

The analog signal processing circuits 13 include the operational amplifier $A_1$ arranged to amplify the difference between a signal representative of the D.C. offset voltage and the signals derived from the sensor 16. To this end, the output of the amplifier AW is applied directly to the positive terminal of the amplifier $A_1$. The negative terminal is coupled to the digital-to-analog network coupled to the up/down counter 30 and will be described more fully hereinafter. The amplifier $A_1$ may also be a conventional amplifier for comparing the difference between the magnitudes of the signals applied to its two input signals.

The up/down counter 30 is a conventional binary coded decimal counter that comprises a portion of the digital signal processing circuits 14. The counter 30 may be controlled as to the direction of counting through the coupling of an appropriate signal to its up/down counting terminal for counting in accordance with the high or low potential level of the signal applied thereto. A high voltage level signal applied to the control terminal of the counter 30 will cause the counter to count up while a low signal will cause the counter to count down. The pulses to be counted are applied to the clock input terminal for counting the counter up or down. A preset terminal for the counter 30 allows it to be set to its maximum count in an "up" direction upon the application of a pulse signal thereto. A preset pulse is generated upon the application of the $V_{CC}$ source to the $V_{CC}$ terminal of the counter 30 though the provision of the capacitor $C_1$ and resistor $R_p$. This differentiating circuit is coupled to the preset terminal of the counter 30 as illustrated. The binary coded bit output signals from the counter 30 are applied to a digital-to-analog converter for converting the value of the binary bits representative of the decimal value stored in the counter to the corresponding analog signal. The digital-to-analog converter illustrated in FIG. 2 is a resistance ladder network wherein the values of the ladder resistors are illustrated as R and 2R. The 2R resistors have a value that are twice the resistance value of the resistors R. The 2R resistors of the network are coupled to the counter 30 and the last 2R resistor (the right-hand resistor as illustrated in FIG. 2) is connected to ground. The R resistors link the individual resistors 2R. The left-hand resistor 2R and the resistor R connected therewith are coupled directly to the minus input terminal of the $A_1$ amplifier. Although the digital to analog converter coupled to the output of the counter 30 is shown as a ladder network, any other similar well known circuit will produce the necessary digital-to-analog conversion such as a binary progression network.

A voltage dividing network comprising the resistors $R_1$ and $R_2$ is connected between the output terminal of the amplifier $A_1$ and ground. The potential at the junction between the resistors $R_1$ and $R_2$ functions in a feedback loop to the minus input terminal of the $A_1$ amplifier. It should be noted at this point in the description that if the digital-to-analog network were not connected to the output of the amplifier $A_1$, the closed loop gain from the plus terminal of amplifier $A_1$ to the output terminal of the amplifier $A_1$ would be $$, (R_1+R_2)/R_2$$

For the purpose of the present invention, the resistance of the digital-to-analog network 30 is considered to have a large resistance value compared to the resistance value of the resistor $R_2$ at the output of the amplifier $A_1$. The digital-to-analog converter, then, can be considered as a current source into the resistor $R_2$. With these resistance values, the circuit is proportioned so that when the counter 30 is preset to its maximum count, the current supplied from the digital-to-analog network into the resistor $R_2$ will produce a bias voltage which is larger than any offset voltage that could be generated and which would appear at the positive terminal of amplifier $A_1$. In the present circuit organization, the offset voltages that are generated can only be of a positive potential value. Accordingly, as will be more evident hereinafter, the output signal from the amplifier $A_1$ cannot rise above zero until the voltage at the minus terminal is reduced to the actual offset voltage appearing at the positive terminal of the amplifier.

The output signal from the amplifier $A_1$ is applied in common to the positive input terminals of the comparators identified as Comp 1 and Comp 2. The negative terminal of the comparator 2 has a bias voltage applied thereto. The bias voltage is coupled thereto through the $V_{SW}$ line and is generated by the series voltage dividing network formed by the resistors $R_7$ and $R_3$. One end of the resistor $R_7$ is connected to the $V_{SW}$ line, while the other end of the resistor $R_3$ is connected to ground. A transistor $Q_2$ is coupled in parallel circuit relationship with the resistor $R_7$. The collector electrode for the transistor Q2 is connected to the $V_{SW}$ line, while the emitter electrode is coupled to the junction between the resistors $R_7$ and $R_3$. The base electrode of the transistor $Q_2$ is connected directly to the output terminal of the comparator Comp 1.

The negative terminal of the comparator Comp 1 is provided with a bias or threshold potential which consists of the voltage dividing network formed by the series resistors $R_4$ and $R_5$. One end of the resistor $R_4$ is connected to the $V_{SW}$ line and its opposite end is connected to the negative input terminal of Comp 1. One end of the resistor $R_5$ is connected in common with the resistor $R_4$ to the negative input terminal of Comp 1 and its opposite end is connected to ground. The bias voltage level provided by the resistors $R_4$ and $R_5$ is proportioned to provide a threshold level for detecting the difference between the wand 10 sensing an "on white" and a "not on white" signal. For this purpose, the threshold level is set for detecting the lowest level "on white" signal provided by the wand 10. This threshold level is selected to cause an output signal to be generated from Comp 1 for signalling an "on white" condition in accordance with the type of paper utilized for the bar code, the reflectance properties, etc. The output from the comparator Comp 1 will be series of black and white signals which are the analog equivalent of the bar coded data recorded on label 11. Accordingly, the black and white signals will either be a high voltage level signal for signalling a white bar or a low level signal for signalling a black bar in accordance with the output levels to which the comparator Comp 1 is adjusted. The black and white signal train is applied to the digital controller 12a wherein it is decoded for use in the data collection system 12.

It will be noted that the digital controller 12a is arranged to provide a signal line $V_{SW}$ for energizing and de-energizing, automatically and periodically, each of the analog circuits arranged within the block 13. The $V_{SW}$ signal line is also applied in parallel circuit relationship to the wand 10 for controlling the light source 15 along with its corresponding amplifier AW.

The digital circuits 14 include circuit means for controlling the conduction of the light source 15. The light source 15 is coupled in series circuit with the transistor $Q_1$ which is biased to control the magnitude of the current flowing through the light emitting diode 15. To this end, the transistor $Q_1$ has its collector electrode connected to the cathode electrode of the light emitting diode 15 with the anode electrode being coupled to the $V_{SW}$ line. The emitter electrode for the transistor $Q_1$ is coupled to ground through the resistor $R_6$. The base electrode for the transistor $Q_1$ is coupled to the strobe signal from the digital control 12a by means of a diode $D_1$. The anode electrode of the diode $D_1$ is coupled directly to the base electrode of transistor $Q_1$ while the cathode is coupled to receive the strobe pulses. The base electrode of the transistor $Q_1$ is also coupled to the $V_{SW}$ line through the resistor $Q_R$. A binary coded decimal count down counter 31 is provided for controlling the bias level at the base electrode for the transistor $Q_1$. The down counter 31 has a clock input terminal for receiving the pulses to be counted and a preset terminal for setting the counter to its maximum count in the positive counting direction when a pulse is applied thereto. The output circuit for the down counter 31 comprises a number of binary coded signals for signalling the count that is stored in the counter 31. A digital-to-analog converter in the form of a resistance network is coupled to the output of the counter 31 for converting the binary bit signals to a corresponding analog signal which is directly coupled to the base electrode of the transistor $Q_1$. The resistance values of the converter network are proportioned in accordance with the binary progression as identified in FIG. 2 as R, 2R, 4R and 8R. These correspond to the decimal numerals 8, 4, 2 and 1 in the binary progression $2^1$, $2^1$, $2^0$ and $2^3$.

The pulses to be counted by the down counter 30 are applied to the clock input terminal by means of an AND gate 32. One input to the AND gate 32 is coupled to receive the strobe pulses from the digital controller 12a. The other input terminal of the AND gate 32 is coupled directly to the output terminal of the Comp 1 comparison element for receiving the train of black and white signals. When both of the signals applied to the gate 32 are high, an output signal will be generated from the circuit 32 to count down the counter 31 one count. The down counter 31 can be preset to the maximum count by a pulse applied to its preset terminal. For this purpose, the preset terminal is coupled to a series capacitor-resistance network to the $V_{CC}$ terminal. The $V_{CC}$ terminal is connected to a corresponding $V_{CC}$ input for the down counter 31 and the capacitor $C_2$. The other terminal of the capacitor $C_2$ is connected to the resistor RS having its other terminal connected to ground. The junction between the resistor RS and the capacitor $C_2$ is coupled directly to the preset terminal for coupling the pulse that is generated by the application of the source to the counter 31. The counter 31 is further constructed so that the minimum count of the counter 31 will be zero. The "carry overs" are programmed out to maintain the zero count once reached.

With the above structure in mind the operation of the wand sigal processing circuits of the present invention can be explained. The $V_{CC}$ voltage applied to the digital circuits 14 is continuously applied once the power switch 21 is closed so that the counters 30 and 31 will be continously energized. With the application of the $V_{CC}$ voltage to the counters 30 and 31, each of them will be set to their maximum count. The counter 30 will be set as a result of the pulse generated by the capacitor $C_1$ upon the closing of the switch 21 that is effective at its preset terminal for the counter 31 through the capacitor $C_2$. With the application of the $V_{CC}$ voltage to the digital circuits 14 and the setting of the counter 30 to its maximum count, the analog signal representative of the count will produce a voltage at the negative input of the amplifier $A_1$ which will be greater than any offset voltage that could appear at the positive terminal of the amplifier $A_1$. The output of the amplifier $A_1$ will be a low voltage level. It will be recalled that the signal coupled to the positive terminal of the amplifier $A_1$ includes the light signal reflected from the label 11 as well as the offset voltage signal so that the amplifier $A_1$ amplifies only the difference between those signals and the analog signal representative of the count stored in the counter 30. With the output of the differential amplifier $A_1$ at the low voltage level, no reading of the label can occur since the comparator Comp 1 input has a low level signal at its positive input terminal provided by $A_1$ and will provide a low level output while those input conditions prevail. The low level output signal from the amplifier $A_1$ will correspondingly produce a low level output signal from Comp 2. The low level output signal from Comp 2 is effective at the up/down control for the counter 30 to set it in the count down position. After the preselected time after the application of the $V_{SW}$ signal to the circuits of the wand 10 and the analog circuits 13 that allows the circuits to settle, the strobe pulse will be provided from the digital controller 12a and will be coupled directly to the counter 30. The counter 30 will be counted down one count in response to the strobe pulse and the previous setting of the up/down counter 30 to a down condition. These conditions will prevail until the up/down counter 30 has been counted down to a count producing a voltage that is slightly below the value of the offset voltage that will be generated in the analog processing circuits. When the up/down counter 30 and the corresponding digital-to-analog circuits provide a signal at the minus terminal of the amplifier $A_1$ which is slightly below the value of the offset voltage appearing in the signal at the positive terminal of the amplifier $A_1$, a high level output signal essentially representative of the sensed light signal will be derived from the amplifier $A_1$.

If the voltage level of the output signal from the amplifier $A_1$, which is applied to the positive input terminal of the Comp 1 is greater than the bias appearing at the negative input terminal, it will signal an "on white" condition by producing a high level output signal at its output terminal. The high level output signal from Comp 1 will render the transistor Q2 in the input bias network for Comp 2 conductive. At some point, the voltage at the positive terminal of comparator Comp 2 will exceed the small bias voltage at the negative input terminal and the output signal therefrom will be switched to a low voltage level and thereby signals a count down to the up/down counter 30. After this has occurred, the up/down counter 30 will alternate between counting up and counting down so that it "hunts" or straddles the actual value of the generated offset voltage as represented by the count stored in the counter 30. The provision of the up/down counter 30 allows any changes in the offset voltage that are generated to be "tracked" or followed by the counter 30 as they are continuously stored in terms of a decimal digit stored in the counter 30 so that at all times the amplifier $A_1$ will only amplify the difference between the stored value of the offset signal and the signals received from the wand 10 at the positive terminal of the amplifier $A_1$. The time interval during which the up/down counter 30 is counted down from its preset maximum count until it reaches a count that is representative of the offset voltages generated by the signal processing circuits is considered the calibration time of the wand 10 and during this interval no reading is possible, i. e., all "black" or low level output signals are received from Comp 1. After this automatic calibration period, the signal processing circuits are conditioned to read or provide an output signal representative of the reflective character of the surface over which the wand 10 is passed.

At the time that the strobe pulse occurs, the light source 15 will have been energized by the current supplied through the transistor $Q_1$ since the $V_{SW}$ line will have gone ON or high. Since the high level of the strobe pulse will overcome the bias normally provided at the base electrode of the transistor $Q_1$, the energization of the light source 15 will be maintained and the wand output can be processed to determine the reflective characteristic. This is determined by the difference between the resulting wand signals appearing at the positive terminal of Comp 1 and the light threshold level at the negative terminal to produce a black or white signal at the Comp 1 output. The output signal from Comp 1 will be examined by the digital control 12a as it was originally programmed to determine the reflective character of the surface sensed. The digital controller 12a will have signal recognition capabilities to determine whether the sensed signal exceeds the bias level at the negative terminal of Comp 1 for signalling that a black or white signal has been received. If a white signal has been sensed, the digital controller 12a will cause the $V_{SW}$ line to remain energized until the reading is completed or a black signal is again detected and persists. The digital controller 12a will decode the train of black and white signals by conventional means by measuring the relative time periods that the black and white signals exist. If the output of Comp 1 does not indicate an "on white" condition, the digital controller 12a will de-energize the line $V_{SW}$ and the strobe signal and await a sufficient time interval to initiate another sampling period to again determine if an "on white" condition has been sensed.

The advantages from the power saving standpoint of the above discussed invention should be better appreciated at this point. It should now be recognized that the analog signal processing circuits 13, including the light source 15 and the amplifier AW, will only be periodically energized while the digital circuits 14 of the present invention will be continuously maintained in energization. The digital circuit components such as the counters 30 and 31, for example, can be integrated circuit elements fabricated from complementary metal oxide semiconductors (CMOS). When constructed of CMOS elements, the current requirements are very low and consumes very little standby power while being continuously energized and therefore does not substantially affect the drain on the battery for the data collection system 12. This feature, coupled with the periodic energization and de-energization of the line $V_{SW}$ is all that is necessary to minimize the drain on the battery while permitting a determination of an "on white" condition for commencing reading of bar coded data. The advantages of this with respect to prior signal processing circuits, such as those discussed in the Hester patent, is that the up/down counter 30 will continuously retain or store the value of the offset voltage including between sampling intervals while the analog signal processing circuits are de-energized. This mode of offset voltage storage minimizes any error which may result such as when the offset voltage is stored on a capacitor. To prevent the discharge of the storage capacitor during the scanning intervals, a long time constant must be provided relative to the scanning time intervals. A long time constant requires a finite time to establish the necessary reference conditions so that it takes a time interval before such prior art circuits are available for reading. This prevents the switching off of the analog switching circuits between sampling intervals. The up/down counter 30 utilized for storage in the present invention can be considered to have an effective infinite time constant during scanning which prevents any discharge of the voltage even though the operator may slowly scan the label 11. The accuracy of the offset calibration can be readily controlled to any degree of precision by the selection of the number of bits for the up/down counter 30 and thereby the precision of the analog signal from the associated digital-to-analog converter.

A further phase of this invention relates to the calibration of the light source 15 to control the magnitude of the current through LED 15 and thereby the light output for standardizing the black and white signals provided to the controller 12a from the comparator Comp 1. When the $V_{CC}$ supply is applied to the count down 31, the down counter 31 is set to its maximum count and can only be counted down to zero. The resulting analog voltage representative of the count stored in the counter 31 is applied to the base electrode of the transistor $Q_1$ through the digital-to-analog converter coupled to the counter 31. This maximum stored count will cause the current that is passed through the light source 15 or the light emitting diode to the maximum value that would ever be expected. During the wand calibration period, the light source 15 is maintained de-energized since the strobe pulse renders the transistor $Q_1$ de-energized by means of the diode $D_1$ coupled thereto. This is due to the initial low level value of the strobe. When the strobe pulse goes through a low to high level transition, the transistor $Q_1$ is energized and the current is passed through the light source 15 resulting in a reflected light signal to be produced and a corresponding reflected light component appears at the amplifier $A_1$. After the signal processing circuits have been calibrated, the output signal from the amplifier $A_1$ will be the amplified version of the reflected light signal. When an "on white" signal is detected at the output of Comp 1, the transistor $Q_2$ at the comparator Comp 2 negative input will cause the bias at its negative terminal to be at an essentially full scale condition. If the output signal from the amplifier $A_1$ exceeds the voltage at the negative terminal at Comp 2, the output signal will be at a high voltage level for signalling a count-up condition at the up/down counter 30 but it will not count at this time interval since the clock input is inactive. Accordingly, if the Comp 2 signals a count-up condition and the Comp 1 signals an "on white" condition, then both of these signals are at a high voltage level causing an output signal to be generated from the AND gate 32. The up/down counter 31 will be counted down one count in response to a pulse from the AND gate 32. When both input signals to the AND gate 32 are high in accordance with the present invention, the "on white" signal is considered to be in an "over scale" condition. Accordingly, the counting down of the down counter 31 one count will reduce the analog signal at the base electrode of the transistor $Q_1$ and thereby reduce the current for the light emitting diode 15 and thereby the light output level. With the continued sensing (after detecting the "on white" signal), the alternate production of black and white signals will continue light count down the counter 31 until the current at the ligth emitting diode 15 is reduced to a voltage value that produces a near full scale white signal. This arrangement does not compensate for surface reflection variations but it does compensate for any long term changes in the output signal from the wand 10. This is true since after the $V_{CC}$ supply is applied to the down counter 31, the current to the light source 15 can only be reduced. This arrangement permits the ambiguities to be resolved between low reflectance background conditions and insufficient light source current (light output) or high reflectance bars and excessive light source current. The standardization of the output signals from the signal processing circuit will improve performance and reduce current consumption.

Figure 3:
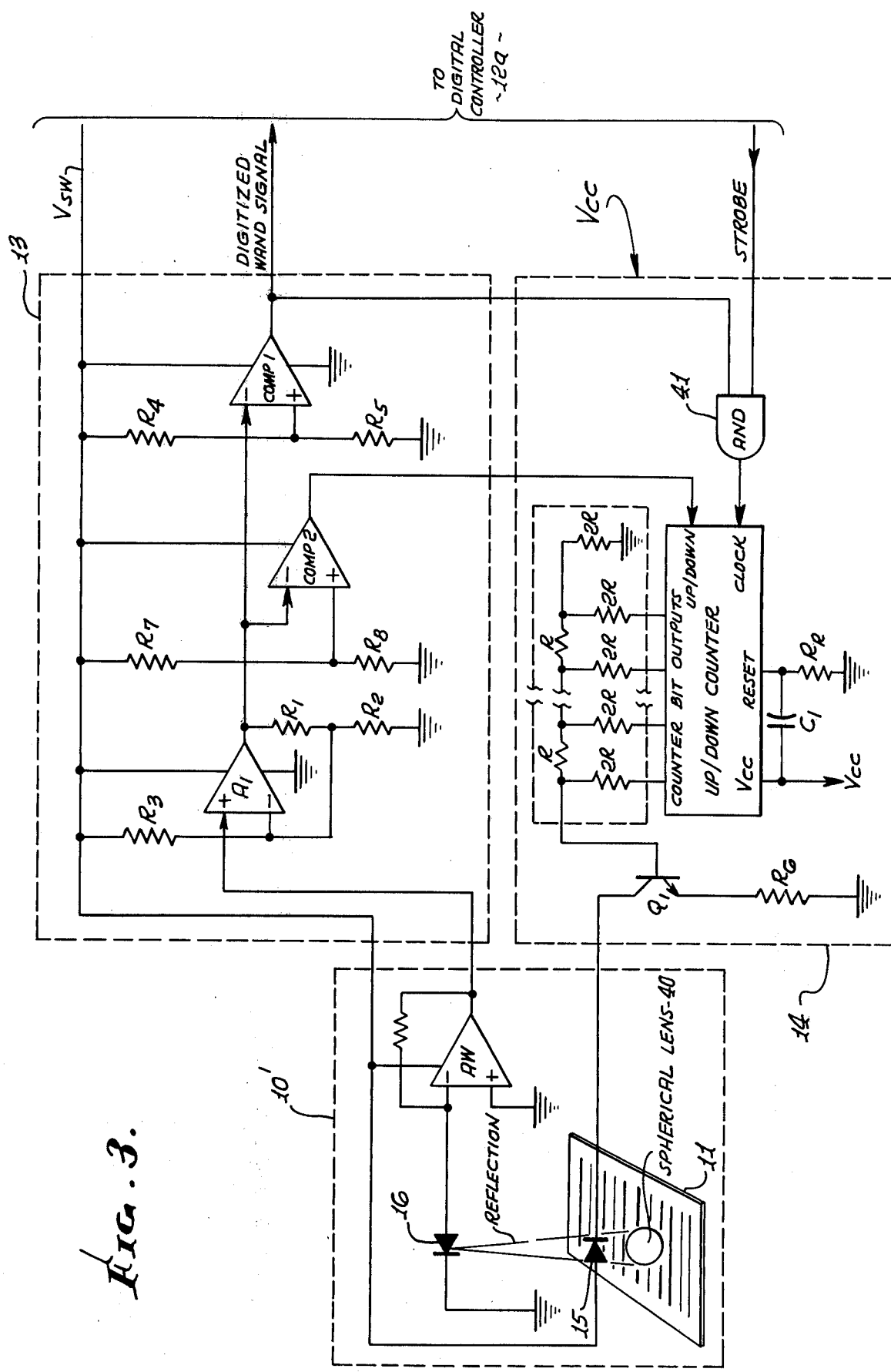
FIG. 3 is a schematic circuit diagram of another embodiment of the invention for use with an optical scanner or wand of a different construction from that illustrated in FIG. 2.

Now referring to FIG. 3, another embodiment of the invention will be described. In the embodiment illustrated in FIG. 3, the type of optical scanner or wand utilized is different from the type discussed in conjunction with the circuits hereinabove. In the type of wand for utilizing the signal processing circuitry of FIG. 3, the illuminating and sensing paths of the light rays share a common optical path. In this type of wand 10', a spherical lens 40 is arranged at the outer tip of the wand 10' for contacting the surface to be scanned which is illustrated in FIG. 3 as the label 11. Such wands are known in the art and disclosed in U.S. Pat. Nos. 3,784,794 and 3,892,974, for example. In the type of wand 10' illustrated in FIG. 3, the light source which is illustrated as a light emitting diode 15 is mounted adjacent the rear surface of the spherical lens 40 which radiates its light rays into the spherical lens 40. The light radiation received from the light source 15 is focused by the spherical lens 40 onto the label 11 and the reflected light rays are focused by the lens 40 onto a light sensor 16, which may be a conventional photo diode. Some of the light rays emitted from the light source 15 are reflected by the lens 40 back to the light sensor 16 without traveling through the lens 40 and impinging on the label 11. In this arrangement, when the wand 10' is not signalling that it is in an "on white" condition, its output signal consists of two components, namely, a D.C. offset voltage and the voltage generated by the internal reflection of the light rays.

When the wand 10' is operated in accordance with the prior art techniques, the associated signal processing circuits and the light source 15 are continuously powered. When the light source 15 and the signal processing circuits are continuously energized, the output signals from the wand 10' which comprise the internal reflected signals and the offset signals, a continuous reference signal is provided and any change from that reference level will be recognized as an "on white" condition. This prior art technique does not utilize the power saving feature of continuously energizing and de-energizing the light source and is less effective than the signal processing circuits heretofore considered.

With respect to applying the concepts discussed hereinabove with regard to the signal processing circuits of FIG. 2, it should be noted that if the light source was energized only after the offset voltage signal was determined and stored, it would be very difficult to distinguish an internal reflection from the lens 40 from a reflection from the label 11. In the present embodiment of the invention, the current through the light source for the light emitting diode 15 is set to zero upon the initiation of the wand scanning operation. The current through the light source 15 is set by the digital circuit 14 of FIG. 3. In this embodiment, the light source 15 is effectively maintained in a de-energized condition until the offset signals, including the signals generated by an internal reflection of the light rays from the source 15 to the lens 40, are determined and stored. Only then are the signals derived from the wand 10' processed by the analog circuits 13 of FIG. 3. This embodiment of the invention also uses the concept of the automatic and periodic switching of the power to the light source 15 ON and OFF and which signal is identified as the $V_{SW}$ signal from the digital controller 12a. The other signals from the digital controller 12a are the same as in the previous embodiment, namely, a strobe pulse signal occurring in the same time relationship with the $V_{SW}$ signal as in the previous embodiment and the $V_{CC}$ supply to the digital circuits 14.

The wand 10' includes an amplifier AW having its negative input terminal connected to receive the signals from the light sensor 16. As in the previous embodiment, the positive terminal of the amplifier AW is connected directly to ground. The output from the wand amplifier AW is applied directly to the positive terminal of the comparator or amplifier $A_1$ included within the analog signal processing circuits 13. In this embodiment, a fixed threshold level is applied to the negative input terminal of the amplifier $A_1$. The threshold potential is defined to be representative of a fixed offset voltage and a fixed reflection signal which is normally generated by the wand 10'. This threshold potential is provided by the resistor $R_3$ having one end connected to the $V_{SW}$ line and one end to the negative input terminal of amplifier $A_1$. A series resistor $R_2$ is also connected to the negative input terminal of the amplifier $A_1$ in common with the resistor $R_3$. The opposite end of the resistor $R_2$ is connected to ground. A feedback resistor $R_1$ is connected from the output of amplifier $A_1$ to the negative input terminal for the amplifier $A_1$. It should be noted that when the light source 15 is de-energized, the output signal from the amplifier $A_1$ cannot be a positive or high output level signal due to the presence of the bias provided at the negative input terminal. The output signal from the amplifier $A_1$ is coupled in parallel circuit relationship to the negative input terminals of the comparators 1 and 2. It should be noted that the comparators 1 and 2 provide the same function in the embodiment of FIG. 3 as they perform in the embodiment discussed above. Specifically Comp 1 signals the "on white" condition of the wand 10' for providing the black and white output signals sensed by the wand 10'. The Comp 2 provides a control output signal for controlling the counting up or counting down of the up-/down counter 30 included within the digital signal processing circuits 14. It should be noted, however, that in this arrangement the output signal from the amplifier $A_1$ is coupled to the opposite terminals of the comparators 1 and 2 from that utilized in the previous embodiment. This reverses the polarity of the output signals derived from the comparators from that previously described.

The positive terminal of Comp 2 is coupled to a fixed bias level provided by the series network of resistors R7 and R8. One end of the resistor R7 is connected to the $V_{SW}$ line and is coupled to one end of resistor R8 in common with the positive input terminal of Comp 2. The other end of resistor R8 is connected to ground potential. The bias potential provided at the positive terminal of Comp 2 is selected so that when the light source 15 is de-energized, the output from Comp 2 provides a high level output signal for signalling the counter 30 to count up. After the offset voltage is stored in the counter 30, the Comp 2 will switch to a low output condition for signalling a count down. The output signal of the Comp 2 is coupled directly to the up/down control terminal for the up/down counter 30 as illustrated.

As in the previous embodiment, the remaining terminal of Comp 1 is provided with a fixed reference bias provided by resistors $R_4$ and $R_5$ coupled thereto. The resistor $R_4$ has one terminal connected to the $V_{SW}$ line and the other terminal of resistor R5 connected to ground. The signals from Comp 1 identify the black and white signals sensed by the wand 10'. In this embodiment, a low output signal will be produced when the "on white" condition is sensed and a high output will be produced when a "not on white" condition is sensed to produce the train of black and white signals.

The digital circuits 14 utilized in FIG. 3 basically comprise the up/down binary coded decimal counter 30 and the digital-to-analog converter for converting the binary coded output signals from the counter 30 to the corresponding analog signals. The digital-to-analog converter illustrated in FIG. 3 is the same resistance ladder network described above. The output of the digital-to-analog converter is coupled to the switching transistor $Q_1$ which is connected in series circuit with the light source 15. Specifically, the output from the digital-to-analog converter is coupled directly to the base electrode of the transistor $Q_1$. The collector electrode for the transistor $Q_1$ is coupled directly to the light source 15 while the emitter electrode is connected to ground through the resistor $R_6$. The up/down counter 30 is energized by means of the $V_{CC}$ source from the digital controller 12a. In this embodiment the counter 30 is initially reset to zero count. For this purpose, the $V_{CC}$ terminal is provided with a resetting network comprised of the capacitor $C_1$ and the resistor $R_R$. One terminal of the capacitor $C_1$ is coupled to the $V_{CC}$ supply while the other terminal is connected in common with the reset input of the counter 30 and the resistor $R_R$. The other terminal of the resistor $R_R$ is coupled to ground. With the application of the $V_{CC}$ source to the counter 30, the counter is automatically reset to the zero state by the pulse generated by $C_1$, thereby maintaining the transistor $Q_1$ in a de-energized or nonconductive condition and the light source 15 correspondingly de-energized.

The strobe signals provided by the digital controller 12a are used in this embodiment as well as for storage in the up/down counter 30. In this embodiment the strobe pulses are applied to the clock input terminal of the counter 30 through an AND circuit 41. The other input of the AND circuit 41 is the digitized output signal from Comp 1, as illustrated. In this embodiment, when the two input signals for the AND circuit 41 are in a high level voltage condition, an output pulse will be applied to the clock terminal of the counter 30. The pulses will be counted up or down in accordance with the high or low voltage level signalled at the up/down control for the counter 30. When the output signal from Comp 1 indicates a "not on white" condition, pulses will be applied to the counter 30 in response to the high level strobe signals until it has been counted up for storing the offset voltage value of the signal generated in the wand 10'. In this arrangement, when an "on white" condition is sensed by the wand 10, the low output signal provided by Comp 1 will prevent the application of the strobe pulses to the counter 30 indicating that the wand is in condition for reading the label 11. In this embodiment, the offset voltages cannot be tracked as in the previous embodiment. After this condition is sensed, the black and white signals will be provided from Comp 1 for indicating the data represented on the bar coded data on the label 11.

With the above structure in mind, the operation of the embodiment of FIG. 3 can be examined in more detail. As noted hereinabove, when the $V_{CC}$ supply is applied to the up/down counter 30, the counter will be set for indicating the decimal digit 0. The resulting analog signal from the digital-to-analog converter will maintain the transistor $Q_1$ and the light source 15 de-energized. With the fixed bias voltages utilized for the amplifier $A_1$ and Comp 1 and 2, it will be appreciated that the output signal from the amplifier $A_1$ cannot be in a positive voltage or high level condition. This will cause a high level output signal to be generated at Comp 2 and a high level output signal from Comp 1. The high level output signal from Comp 2 will signal the up/down counter 30 to count up. When the $V_{SW}$ line is energized by the digital controller 12a, the light source 15 will be maintained de-energized. Following the energization of the $V_{SW}$ line, the strobe signal is provided by the digital controller 12a. When a high level output signal is produced from Comp 1 after the strobe signal from the controller 12a goes through a low to high transition, it will cause an output signal to be produced from the AND gate 41 for counting the counter 30 up one count. The $V_{SW}$ line and the strobe signal will be automatically de-energized after a preselected period in accordance with the concept of the present invention. During the next time interval that the $V_{SW}$ line is energized, the same conditions will prevail and when the next strobe signal is generated, the counter 30 will be counted up another decimal digit for representing the digit 2. These conditions will continue until the counter 30 is counted up to a value so that the converted analog voltage value and consequent LED current that produces an internal reflection signal that is equivalent to the bias level applied to the negative input terminal of the amplifier $A^1$. After this time interval, the signals from the wand 10' applied to the amplifier $A^1$ will exceed the signal at the negative terminal so that the positive output signal will be provided from the amplifier and the corresponding polarity of the output signal from Comp 2 will be reversed. With the reversal of the signal from Comp 2, a count down signal will be provided. This will cause the counter to count down at the next application of a strobe pulse. The wand 10' has now been calibrated and the counter will alternate between count up and count down.

If the wand is against a reflecting surface, the output A will be more positive than plus input of Comp 1, causing the output of Comp 1 to go low. This prevents the passage of the strobe pulse through AND gate 41 so that the counter is not counted when the wand is "on white".

In this embodiment, it has been determined that the signals generated as the result of internal reflection of the light rays from the optical lens are fairly constant. It should be noted that the arrangement of FIG. 3 is practical only if the internal reflection signals are large relative to any changes in offset voltages. The internal reflection signals essentially override the changes in offset voltage.

What is claimed is:

1. Apparatus for optically reading bar coded data wherein the binary bits are encoded in terms of bars of different widths of the same optical characteristics separated by areas of the opposite optical characteristic comprising
    optical sensing means for producing electrical signals representative of the optical characteristics of a surface presented thereto upon the production of relative movement between the surface and the sensing means, said sensing means having a light source and a light sensor for receiving the light rays from the light source reflected from the surface being sensed, the sensor output signals including an unknown offset voltage,
    analog signal processing means for processing the signals from the sensor and providing analog signals representative of the sensed bars of the different optical characteristics,
    digital signal processing means for storing and continuously signalling the analog value of the offset signals generated and coupled to the analog signal processing means, and
    control circuit means including means for automatically and periodically energizing the light source and the analog signal processing means and maintaining the energization of same in response to a signal representative of a bar of one optical characteristic and automatically de-energizing said same elements in response to a signal representative of a bar of the other optical characteristic.

2. Apparatus for optically reading bar coded data wherein the binary bits are encoded in terms of bars of different widths of the same optical characteristic separated by areas of the opposite optical characteristic as defined in claim 1 wherein the digital signal processing means are further characterized as being continuously energized.

3. Apparatus for optically reading bar coded data wherein the binary bits are encoded in terms of bars of different widths of the same optical characteristic separated by areas of the opposite optical characteristic as defined in claim 2 wherein the digital signal processing means comprises means for controlling the conductivity of the light source for standardizing said analog output signals.

4. Apparatus for optically reading bar coded data wherein the binary bits are encoded in terms of bars of different widths of the same optical characteristic separated by areas of the opposite optical characteristic comprising
    optical sensing means for producing electrical signals representative of the optical characteristics of a surface presented thereto upon the production of relative movement between the surface and the sensing means, said sensing means having a light source and a light sensor for receiving the light rays from the light source reflected from the surface being sensed, the sensor output signals including an unknown offset voltage,
    means for automatically determining the value of the unknown offset voltage and continuously storing the value thereof, and
    means for amplifying the difference between the signals from the signal processing means and the value of the stored unknown voltage and producing an output signal representative thereof,
    means for automatically determining the reflective characteristic of the surface sensed as represented by the output signal from said amplifying means, and means for automatically and periodically energizing the light source, the amplifying means and the reflective characteristic determing means and maintaining the energization of said elements in response to an output signal representative of one reflective characteristic and automatically de-energizing the light source in response to an output signal representative of the other reflective characteristic.

5. Apparatus for optically reading bar coded data wherein the binary bits are encoded in terms of bars of different widths of the same optical characteristic separated by areas of the opposite optical characteristic as defined in claim 4 wherein said means for storing the offset voltage value includes up/down counting means.

6. Apparatus for optically reading bar coded data wherein the binary bits are encoded in terms of bars of different widths of the same optical characteristic separated by areas of the opposite optical characteristic as defined in claim 4 or 5 including means for standardizing the current through the light source.

7. Apparatus for optically reading bar coded data wherein the binary bits are encoded in terms of bars of different widths of the same optical characteristic separated by areas of the opposite optical characteristic as defined in claim 4 or 5 wherein the optical sensing means includes a spherical lens on the tip of the sensor.

8. Apparatus for optically reading bar coded data wherein the binary bits are encoded in terms of bars of different widths of the same optical characteristic separated by areas of the opposite optical characteristic comprising
    optical sensing means for producing electrical signals representative of the optical characteristics of a surface presented thereto upon the production of relative movement between the surface and the sensing means, said sensing means having a light source and a light sensor for receiving the light rays from the light source reflected from the surface being sensed, the sensor output signals including an unknown offset voltage, a binary coded up/down counting means for storing a count representative of the offset value, a digital-to-analog circuit means for converting the count stored in said counter to a corresponding analog signal, differential amplifying circuit means coupled to be responsive to said analog signals and the output signal from said optical sensing means for amplifying only the difference between the two, first comparison circuit means coupled to be responsive to the difference between the output signal from said differential amplifying circuit means and a preselected threshold level for providing output signals representative of the reflective characteristic of the sensed surface, second comparison circuit means coupled to be responsive to the output signal from the differential amplifying circuit means and a preselected bias level for providing an output signal for controlling the direction of counting the said up/down counting means, means for presetting the up/down counting means to a preselected count upon the application of electrical power thereto, said preselected count causing an output signal to be produced at said second comparison circuit means for providing a count down signal, and control circuit means coupled to the light source, the differential amplifying circuit means and the first and second comparison circuit means for automatically and periodically energizing each of said means and including means for maintaining the energization of each of said means in response to a sensed signal of one kind and automatically de-energizing each of said means in response to a sensed signal of the other kind, said control circuit means including means for providing strobe pulses coupled to said counting means, the second comparison circuit means providing a control signal for counting down the counting means in response to the source of pulses until the value of the offset voltage value is stored therein to thereby maintain the apparatus in a nonread mode, and thereafter in a read mode.

9. A method of optically reading bar coded data wherein binary bits are encoded in terms of bars of different widths of the same optical characteristics separated by areas of the opposite optical characteristic comprising the steps of producing relative movement between the bar coded data and an optical bar coded sensor for producing electrical signals representative of the sensed binary bits, the sensor including a light source and a light sensor for receiving the light rays reflected from the bar coded data representative of the sensed binary bits and producing corresponding electrical signals, providing signal processing circuits for the signals produced by the sensor, maintaining the light source and the associated signal processing circuits normally de-energized, automatically and periodically energizing the light source and the associated signal processing circuits at a preselected rate, determining the voltage value of the offset signals generated by the signal processing circuits and continually storing the value, amplifying the difference between the stored offset value and the signals produced by the light sensor and the associated signal processing circuits, determining the reflective characteristic of the surface exposed to the sensor by means of the resulting difference signal, if no reflective surface is sensed, automatically de-energizing the light source and the associated signal processing circuits while maintaining the storage of the value of the offset signals, if a reflective surface is sensed, maintaining the light source and the associated signal processing circuits energized, and generating the electrical signals representative of the bar coded data while the light source and the signal processing circuits are maintained in energization.

10. A method of optically reading bar coded data wherein binary bits are encoded in terms of bars of different widths of the same optical characteristics separated by areas of the opposite optical characteristic as defined in claim 9 including the step of calibrating the current through the light source for standardizing the sensed output signals.

11. A method of optically reading bar coded data wherein binary bits are encoded in terms of bars of different widths of the same optical characteristics separated by areas of the opposite optical characteristic as defined in claim 9 or 10 including the step of maintaining the signal processing circuits in a "non-read" condition until the offset signals are determined.

12. A method of optically reading bar coded data wherein binary bits are encoded in terms of bars of different widths of the same optical characteristics separated by areas of the opposite optical characteristic as defined in claim 9 wherein the optical bar coded sensor includes a spherical lens on the tip of the sensor for contacting the surface to be sensed, and the offset signals include the signals generated by the internal reflection of the light rays against the spherical lens.

13. A method of optically reading bar coded data wherein binary bits are encoded in terms of bars of different widths of the same optical characteristics separated by areas of the opposite optical characteristic comprising the steps of producing relative movement between the bar coded data and an optical bar coded sensor for producing electrical signals representative of the sensed binary bits, the sensor including a light source and a light sensor for receiving the light rays reflected from the bar coded data representative of the sensed binary bits and producing corresponding electrical signals, providing signal processing circuits for the signals produced by the sensor, maintaining the light source and the associated signal processing circuits normally de-energized, automatically and periodically energizing the light source and the associated signal processing circuits at a preselected rate, continuously storing the voltage value of the offset signals generated by the signal processing circuits, amplifying the difference between the stored offset signals and the signals produced by the light sensor and the associated signal processing circuits, controlling the stored voltage value of the offset signal in accordance with the value of the amplified difference signal for maintaining the signal processing circuits in a "non-read" condition until the value of the stored offset signal has been obtained, after the stored voltage of the offset signal has been obtained, determine the reflective characteristic of the surface exposed to the sensor by means of the signal processing circuits, if no refective surface is sensed, automatically de-energizing the light source and the associated signal processing circuits, if a reflective surface is sensed, maintaining the light source and the associated signal processing circuits energized, and generating the electrical signals representative of the bar coded data while the light source and the signal processing circuits are maintained in energization.

14. A method of optically reading bar coded data wherein binary bits are encoded in terms of bars of different widths of the same optical characteristics separated by areas of the opposite optical characteristic as defined in claim 13 including the step of maintaining the stored value of the offset signal while the light source and associated signal processing signals are de-energized and continuously following the changes in the offset signal and storing the changed offset signal.

15. A method of optically reading bar coded data wherein binary bits are encoded in terms of bars of different widths of the same optical characteristics separated by areas of the opposite optical characteristic as defined in claim 14 including the steps of automatically calibrating the light sensor output for standardizing the output electrical signals representative of the sensed binary bits.

16. Apparatus for optically reading bar coded data wherein the binary bits are encoded in terms of bars of different widths of the same optical characteristic separated by areas of the opposite optical characteristic comprising optical sensing means for producing electrical signals representative of the optical characteristics of a surface presented thereto upon the production of relative movement between the surface and the sensing means, said sensing means having a light source and a light sensor for receiving the light rays from the light source reflected from the surface being sensed, the sensor output signals including an unknown offset voltage, first amplifying circuit means coupled to be responsive to the signals from the light sensor including the offset voltages, a binary coded decimal up/down counting means for storing a count representative of the offset value, digital-to-analog circuit means for converting the count stored in said counter to a corresponding analog signal, differential amplifying circuit means coupled to be responsive to said analog signal and the output signal from said first amplifying means for amplifying only the difference between the two, first comparison circuit means coupled to be responsive to the difference between the output signal from said differential amplifying circuit means and a preselected threshold level for providing output signals representative of the reflective characteristic of the sensed surface, second comparison circuit means coupled to be responsive to the output signal from the differential amplifying circuit means and a preselected bias level for providing an output signal for controlling the direction of counting of said up/down counting means, means for presetting the up/down counting means to a preselected count upon the application of electrical power thereto, said preselected count causing an output signal to be produced at said second comparison circuit means for providing a count down control signal, control circuit means coupled to the light source, the first amplifying means, the differential amplifying circuit means and the first and second comparison circuit means for automatically and periodically energizing each of said means and including means for maintaining the energization of each of said means in response to a sensed signal of one kind and automatically de-energizing each of said means in response to a sensed signal of the other kind, said control circuit means including means for providing strobe pulses coupled to said counting means, the second comparison circuit means providing a control signal for counting down the counting means in response to the source of pulses until the value of the offset voltage value is stored therein to thereby maintain the apparatus in a non-read mode, switching circuit means coupled to the light source for controlling the energization and light output thereof, said switching means including means coupled to be responsive to said strobe pulses for maintaining the light source de-energized during the initial counting down of said counting means from said preselected count, a binary coded count down counting means for storing a preselected maximum count and preselected minimum count, means for presetting the count down counting means to the preselected maximum count upon the application of electrical power thereto, said counting means being adapted to be maintained at the preselected minimum count upon being counted down thereto, control circuit means coupled to be responsive to the output signals from the first comparison circuit means and the output signal from the second comparison circuit means to count down the count down counting means when said signals are both of the same kind until the counting means is set to the preselected minimum count, and digital-to-analog circuit means coupled to be responsive to the output signals from the counting means for providing a corresponding output signal, the resulting analog signal being coupled to the switching circuit means for setting the light output of the light source.

17. Apparatus for optically reading bar coded data wherein the binary bits are encoded in terms of bars of different widths of the same optical characteristic separated by areas of the opposite optical characteristic comprising optical sensing means for producing electrical signals representative of the optical characteristics of a surface presented thereto upon the production of relative movement between the surface and the sensing means, said sensing means having a light source and a light sensor for receiving the light rays from the light source reflected from the surface being sensed, the sensor output signals including an unknown offset voltage, first amplifying circuit means coupled to be responsive to the signals from the light sensor including the offset voltages, a binary coded up/down counting means for storing a count representative of the offset value, digital-to-analog circuit means for converting the count stored in said counter to a corresponding analog signal, means for presetting the up/down counting means to a preselected minimum count upon the application of electrical power thereto, switching circuit means coupled to the light source for controlling the conductivity and light output thereof, differential amplifying circuit means coupled to be responsive to the signals from said first amplifying circuit means and a preselected offset threshold voltage signal and provides a difference output signal, first comparison circuit means coupled to be responsive to the output signal from the differential amplifying circuit means and a preselected threshold level for providing output signals representative of the reflective characteristic of the sensed surface, second comparison circuit means coupled to be responsive to the output signal from the differential amplifying circuit means and a preselected bias level for providing an output signal for controlling the direction of counting of said up/down counting means, control circuit means coupled to the light source, the differential amplifying means and the first and second comparison circuit means for automatically and periodically energizing each of said means and including means for maintaining the energization of each of said means in response to a sensed signal of one kind and automatically de-energizing each of said means in response to a sensed signal of the other kind, said control circuit means including means for providing strobe pulses periodically occurring, gating circuit means coupled to be responsive to the strobe pulses and the output signals from the second comparison circuit means for counting up the up/down counting means when said signals are both of the same kind, and switching circuit means coupled to the light source for controlling the conductivity and the light output thereof and coupled to be responsive to the analog signal from the analog-to-digital converter for maintaining the light source de-energized until a preselected count is reached by said up/down counting means.

* * * * *

UNITED STATES PATENT OFFICE
CERTIFICATE OF CORRECTION

Patent No. 4,160,156          Dated  July 3, 1979

Inventor(s)  Paul Sherer

It is certified that error appears in the above-identified patent and that said Letters Patent are hereby corrected as shown below:

```
Column  5, line 32, after "conventional" add the word --
                    operational --
Column  7, line 57, the numeral "30" should read -- 31 --
Column  8, line 15, "siga" should read -- signal --
Column 11, line 31, "ligth" should read -- light --
Column 15, line 16,  after "output" add the words
                    -- of amplifier --
Column 16, line 25, delete the "and"
   "      ", line 29, after "thereof," add the word -- and --
   "      ", line 35, "determing" should read -- determining --
Column 19, line 28, "signals" should be changed to read
                    -- circuits --.
```

*Signed and Sealed this*

*Twenty-seventh* Day of *May 1980*

[SEAL]

Attest:

SIDNEY A. DIAMOND

*Attesting Officer*          *Commissioner of Patents and Trademarks*